United States Patent

Tsuyama et al.

[11] Patent Number: 5,263,548
[45] Date of Patent: Nov. 23, 1993

[54] VEHICLE SLIP CONTROL SYSTEM

[75] Inventors: Toshiaki Tsuyama; Kazutoshi Nobumoto; Kaoru Sotoyama; Makoto Kawamura; Fumio Kageyama; Haruki Okazaki, all of Hiroshima, Japan

[73] Assignee: Mazda Motor Corporation, Hiroshima, Japan

[21] Appl. No.: 867,832

[22] Filed: Apr. 14, 1992

[30] Foreign Application Priority Data

| Apr. 15, 1991 | [JP] | Japan | 3-082346 |
| Apr. 30, 1991 | [JP] | Japan | 3-128525 |
| Apr. 30, 1991 | [JP] | Japan | 3-128526 |
| Apr. 30, 1991 | [JP] | Japan | 3-128527 |

[51] Int. Cl.[5] ............ B60K 28/16; B60T 8/58
[52] U.S. Cl. ............... 180/197; 364/426.03
[58] Field of Search ......... 180/197; 364/426.02, 364/426.03; 303/92

[56] References Cited

U.S. PATENT DOCUMENTS

| 4,667,297 | 5/1987 | Kawai | 364/426.03 X |
| 4,765,430 | 8/1988 | Schulze et al. | 180/197 |
| 4,771,850 | 9/1988 | Matsuda | 180/197 |
| 4,778,025 | 10/1988 | Sakaguchi et al. | 180/197 |
| 4,884,651 | 12/1989 | Harada et al. | 180/197 |
| 4,953,093 | 8/1990 | Etoh | 364/426.03 X |
| 4,955,449 | 10/1990 | Hilburger et al. | 180/197 |
| 4,962,570 | 10/1990 | Hosaka et al. | 180/197 X |
| 4,974,694 | 12/1990 | Matsumoto | 180/197 |
| 5,072,995 | 12/1991 | Kawamura et al. | 180/197 X |

Primary Examiner—Margaret A. Focarino
Assistant Examiner—Peter English
Attorney, Agent, or Firm—Sixbey, Friedman, Leedom & Ferguson

[57] ABSTRACT

A slip control system for a vehicle having a differential which distributes engine output to left and right driving wheels suppresses the engine output when the slip of at least one of the driving wheels exceeds a first threshold value. Slips of the left and right driving wheels are periodically detected, and a spin pattern of the driving wheels is periodically determined on the basis of the slips of the left and right driving wheels. Whether the vehicle is running on a split surface road, where the parts of the road surface in contact with the left and right driving wheels have different friction coefficients, is determined on the basis of the present spin pattern and the preceding spin pattern according to a predetermined split surface determining rule. When it is determined that the vehicle is running on a split surface road, the first threshold value is increased.

21 Claims, 14 Drawing Sheets

FIG.6

| $F_1$ | $F_2$ | $P_{SP}$ |
|---|---|---|
| 0 | 0 | 0 |
| 1 | 0 | 1 |
| 0 | 1 | 2 |
| 1 | 1 | 3 |

FIG.7

| $F_{SP}$ | | $P_{SP}$ | | | |
|---|---|---|---|---|---|
| | | 0 | 1 | 2 | 3 |
| $P'_{SP}$ | 0 | 0 | 1 | 1 | 0 |
| | 1 | 2 | 1 | 0 | 0 |
| | 2 | 2 | 0 | 1 | 0 |
| | 3 | 0 | 0 | 0 | 0 |

FIG.11

RATE OF CHANGE IN DRIVING WHEEL SPEED

− ←――――― 0 ―――――→ +

DEVIATION OF DRIVING WHEEL SPEED  − ↑ 0 ↓ +

| PB | PB | PM | PS | ZO |
|----|----|----|----|----|
| PM | PM | PS | ZO | NS |
| PM | PS | ZO | NS | NM |
| PS | ZO | NS | NM | NM |
| ZO | NS | NM | NB | NB |

FIG.12

| PB | PM | PS | ZO | NS | NM | NB |
|----|----|----|----|----|----|----|
| 10 | 5  | 2  | 0  | −2 | −5 | −10 |

F I G. 13
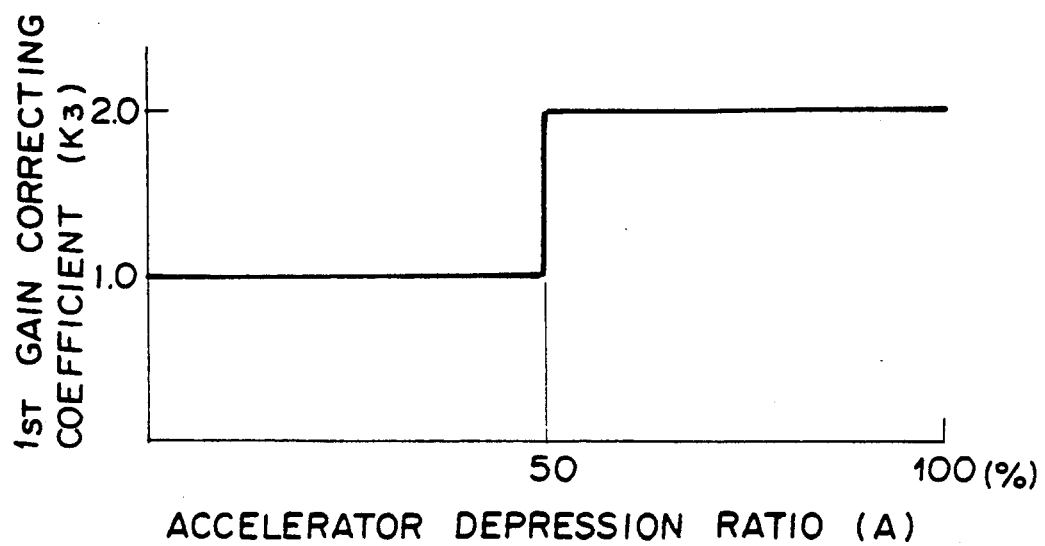
F I G. 14
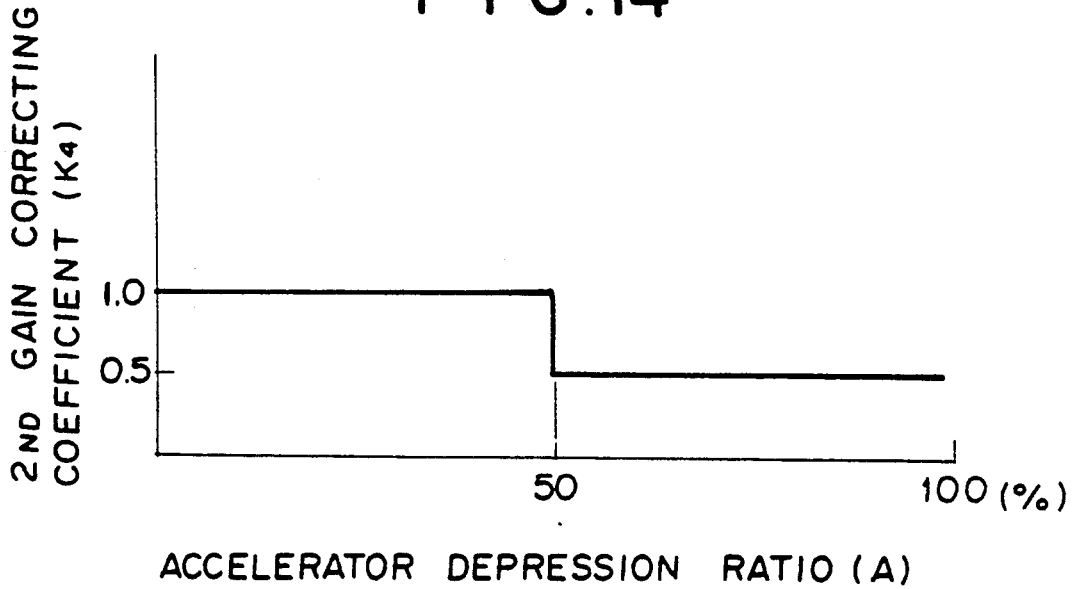

VEHICLE SLIP CONTROL SYSTEM

BACKGROUND OF THE INVENTION

1. Field of the Invention

This invention relates to a vehicle slip control system which controls the driving force according to slip condition of the driving wheels.

2. Description of the Prior Art

There has been known a traction control system for a vehicle which suppresses driving force of the driving wheels in order to prevent the driving wheels from slipping due to an excessive driving torque to deteriorate starting performance and/or acceleration performance. Such a traction control is initiated, for instance, when the difference between the wheel speed of the driving wheels and the driven wheels detected by wheel speed sensors exceeds a predetermined value, and the engine output and/or the braking force applied to the driving wheels are feedback-controlled so that the difference in the wheel speeds converges on a predetermined target value.

On a slippery road such as that covered with snow, the vehicle can skid due to difference in the friction coefficient between the parts of the road in contact with the left and right driving wheels when an excessive driving torque is transmitted to the driving wheels. Such a phenomenon is especially remarkable in a vehicle provided with a driving force distributing means such as a differential in a driving force transmission path between the engine and the left and right driving wheels.

In order to overcome the problem, as disclosed, for instance, in Japanese Unexamined Patent Publication No. 60(1985)-128028, there has been known a traction control system in which the wheel speeds of the left and right driving wheels are separately detected and the driving torque output from the power plant is reduced while there is a difference between the wheel speeds of the left and right driving wheels. With this arrangement, the engine output is reduced so long as there is a difference between the wheel speeds of the left and right driving wheels, whereby excessive driving force cannot be transmitted to the driving wheels.

However, if the driving torque is always reduced when there is a difference between the wheel speeds of the left and right driving wheels as in the traction control system described above, there arises the following problem when running a so-called split surface road where the friction coefficient of the part of the road in contact with the left driving wheel differs from that in contact with the right driving wheel. That is, the driving torque is reduced so long as the road gripping force of one of the driving wheels is somewhat poor even if one of the driving wheels can grip the road surface in such an extent that ensures normal running and accordingly, the starting performance and the accelerating performance are suppressed in spite of the driver's will.

Thus it has been proposed to shift the control, when running a split surface road, from a normal control where the driving force is simply suppressed when the driving wheels are spinning to a split control where the engine output is controlled attaching importance to the starting performance and the accelerating performance. However in order to realize such a traction control system, the split surface road must precisely detected. For example, the left and right driving wheels can alternately spin on a low friction coefficient road such as a frozen road, and in such a case, there is generated a difference between the wheel speeds of the left and right driving wheels, which can lead to the mistake of determining that the vehicle is running a split surface road. Further, spin of the slipping driving wheel can temporarily subside during running on split surface road and when the split control is simply interrupted in such a case, the response of the system upon resumption of spin deteriorates.

SUMMARY OF THE INVENTION

In view of the foregoing observations and description, the primary object of the present invention is to provide a slip control system for a vehicle having a driving force distributing means which distributes engine output to left and right driving wheels which can effect the slip control in an optimal manner according to the condition of the road surface.

Another object of the present invention is to provide a slip control system for a vehicle having a driving force distributing means which can improve the starting performance of the vehicle while preventing malfunction in determining whether the vehicle is running on a split surface road.

In accordance with the present invention, there is provided a slip control system for a vehicle which comprises a first slip detecting means which periodically detects the slip of the left driving wheel, a second slip detecting means which periodically detects the slip of the right driving wheel, an engine output control means which suppresses the engine output when the slip of at least one of the driving wheels detected by the first and second slip detecting means exceeds a first threshold value, a split surface determining means which determines whether the vehicle is running on a split surface road, where the parts of the road surface in contact with the left and right driving wheels have different friction coefficients, on the basis of the slips of the respective driving wheels detected by the first and second slip detecting means, and an engine output suppression releasing means which reduces the suppression of the engine output by the engine output control means when the split surface determining means determines that the vehicle is running on a split surface road and in which said split surface determining means has a spin pattern determining means which periodically determines a spin pattern of the driving wheels on the basis of the detection of the first and second slip detecting means, and determines whether the vehicle is running on a split surface road on the basis of the present spin pattern and the preceding spin pattern according to a predetermined split surface determining rule.

With this arrangement, the driving force can be controlled properly reflecting various road surface condition.

In one preferred embodiment of the present invention, said split surface determining rule is arranged so that the split surface determining means determines that the vehicle is running on a split surface road even if the present spin pattern indicates that neither of the driving wheels is slipping so long as the preceding spin pattern indicates that one of the driving wheels was slipping.

With this arrangement, the split surface determining means cannot determines by mistake that the road the vehicle is running is not a split surface road in the case where the spin of the driving wheels temporarily subsides during running on a split surface road.

In another preferred embodiment of the present invention, said split surface determining rule is arranged so that the split surface determining means does not determine that the vehicle is running on a split surface road even if the present spin pattern indicates that one of the driving wheels is slipping so long as the preceding spin pattern indicates that the other driving wheel was slipping.

With this arrangement, it cannot be determined that the vehicle is running on a split surface road when the vehicle is running a low friction coefficient and the left and right driving wheels alternately slip.

BRIEF DESCRIPTION OF THE DRAWINGS

FIG. 6 is a view showing an example of the spin pattern map, FIG. 7 is a view showing an example of the split surface determination map, FIG. 11 is a view showing an example of the table for calling gain label, FIG. 12 is a view showing an example of the table for setting the basic throttle gain, FIG. 13 is a view showing an example of the first gain correcting coefficient map, FIG. 14 is a view showing an example of the second gain correcting coefficient map.

DESCRIPTION OF THE PREFERRED EMBODIMENT

Figure 1:
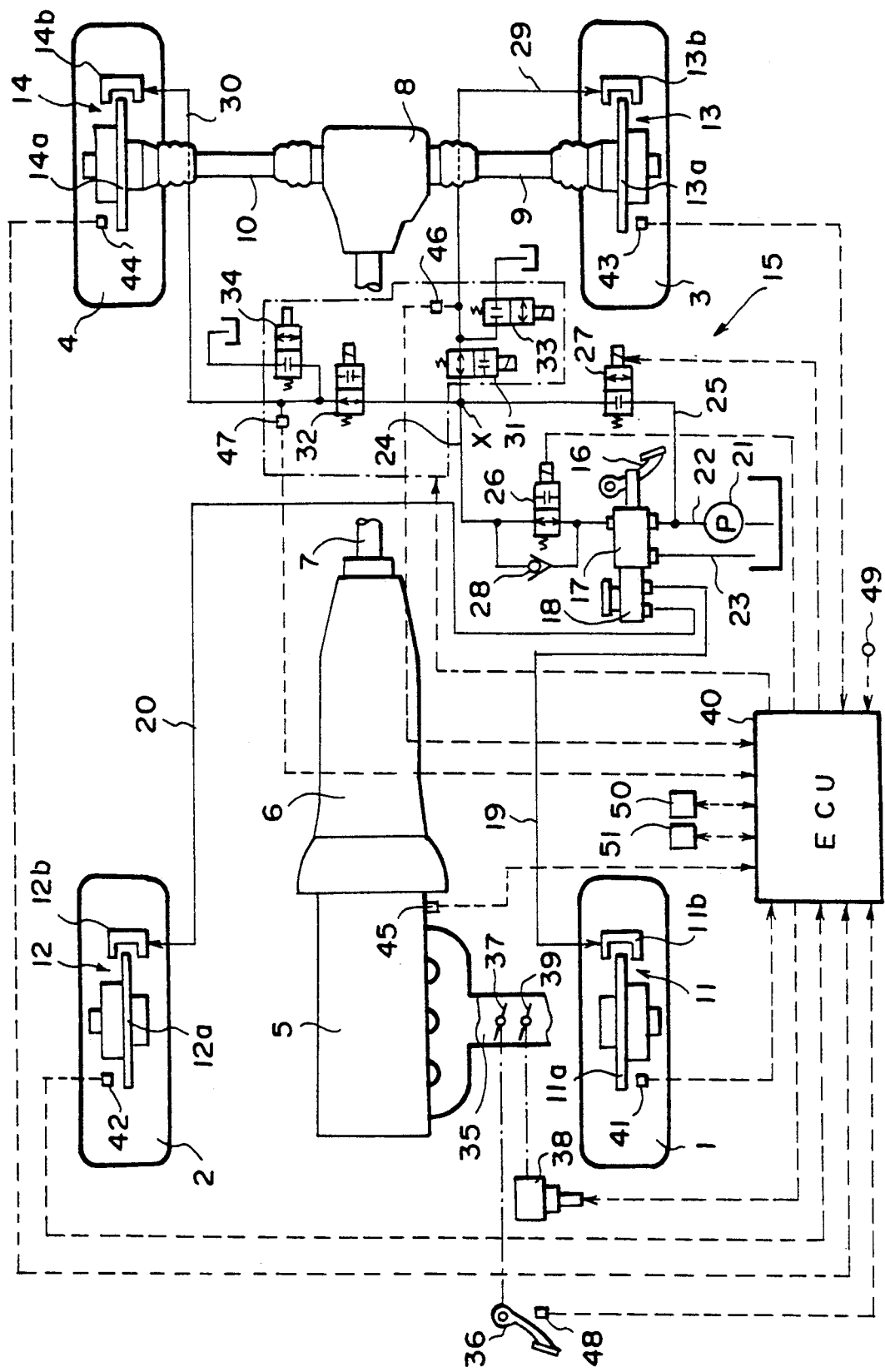
FIG. 1 is a schematic view showing a vehicle provided with a slip control system in accordance with an embodiment of the present invention.

In FIG. 1, a vehicle provided with a slip control system in accordance with a first embodiment of the present invention has left and right front wheels 1 and 2 which are driven wheels and left and right rear wheels 3 and 4 which are driving wheels. The output torque of an engine 5 is transmitted to the rear wheels 3 and 4 through a transmission 6, a propeller shaft 7, a differential 8 and left and right drive shafts 9 and 10.

The wheels 1 to 4 are respectively provided with brakes 11 to 14 comprising disks 11a to 14a which are rotated together with the wheels 1 to 4 and calipers 11b to 14b which are provided with braking pressure and brakes the disks 11a to 14a. The brakes 11 to 14 are controlled by a brake control system 15.

The brake control system 15 has a booster 17 and a master cylinder 18. Reference numeral 16 denotes a brake pedal. Braking pressure lines 19 and 20 for the front wheels 1 and 2 led from the master cylinder 18 are respectively connected to the calipers 11b and 12b for the left and right front wheels 1 and 2. The braking pressure which is generated by the master cylinder 18 according to the brake pedal pushing force is directly applied to the brakes 11 and 12 through the braking pressure lines 19 and 20.

To the booster 17 are connected a working pressure line 22 for supplying a working pressure from a pump 21 and a return line 23 for returning excessive oil to a reservoir. A first braking pressure line 24 is led from the booster 17 and is provided with a first electromagnetic on-off valve 26, and a second braking pressure line 25 branches off from the working pressure line 22 and is provided with a second electromagnetic on-off valve 27. The first braking pressure line 24 is provided with a check valve 28 in parallel to the first on-off valve 26. The first and second braking pressure lines 24 and 25 merge together at a junction X, and braking pressure lines 29 and 30 for the rear wheels respectively extend to the calipers 13b and 14b of the brakes 13 and 14 for the rear wheels 3 and 4. The braking pressure lines 29 is provided with an electromagnetic on-off valve 31 and an electromagnetic relief valve 33, and the braking pressure lines 30 is provided with an electromagnetic on-off valve 32 and an electromagnetic relief valve 34.

A main throttle valve 37 which is connected to an accelerator pedal 36 and a sub throttle valve 39 which is connected to an actuator 38 are provided in an intake passage 35 of the engine 5.

An electronic control unit 40 for traction control is provided. The control unit 40 receives signals from wheel speed sensors 41 to 44 which detect the rotational speeds of the respective wheels 1 to 4, an engine speed sensor 45 which detects the engine speed, a first pressure sensor 46 which detects the braking pressure applied to the brake 13 for the left rear wheel 3 through the braking pressure line 29, a second pressure sensor 47 which detects the braking pressure applied to the brake 14 for the right rear wheel 4 through the braking pressure line 30, an accelerator position sensor 48 which detects the amount of depression of the accelerator pedal 36 and a steering angle sensor 49 which detects the turning angle of the steering wheel. The control unit 40 controls the on-off valves 26, 27, 31 and 32, relief valves 33 and 34 and the actuators 38 for controlling the opening of the sub throttle valve 39 on the basis of these signals. When the first on-off valve 24 in the first braking pressure line 24 is opened, the second on-off valve 27 in the second braking pressure line 25 is closed, and the on-off valves 31 and 32 in the braking pressure lines 29 and 30 for the rear wheels are opened under the control of the control signal from the control unit 40, a braking pressure produced by the booster 17 according to the brake pedal pushing force is applied to the brakes 13 and 14 for the rear wheels 3 and 4 through the first braking pressure line 24.

When the control unit 40 performs the traction control by the brake control, the control unit 40 closes the first on-off valve 26 and opens the second on-off valve 27. In this case, the working pressure produced by the pump 21 is fed to the braking pressure lines 29 and 30 for the rear wheels 3 and 4 as the braking pressure without passing through the booster 17.

When the control unit 40 detects on the basis of the signals from the wheel speed sensors 41 to 44 that, for instance, the left rear wheel 3 is spinning, the control unit 40 brakes the left rear wheel 3 at a braking pressure according to the state of slip of the wheel 3 by opening and closing the on-off valve 31 and the relief valve 33 in the braking pressure line 29 by duty control. At the same time, the control unit 40 brakes the right rear wheel 4 at a braking pressure according to the state of slip of the wheel 4 by opening and closing the on-off valve 32 and the relief valve 34 in the braking pressure line 30 by duty control. That is, in this embodiment, the braking pressures applied to the brakes 13 and 14 are controlled separately from each other. The control unit 40 determines that the rear wheel (the driving wheel) is spinning when, for instance, the rotational speed of the relevant rear wheel is larger than the rotational speed $V_F$ of the front wheels 1 and 2, e.g., the average of the rotational speeds of the front wheels 1 and 2.

The control unit 40 determines whether the road surface the vehicle is running on is a split surface on the basis of the signals input from the wheel speed sensors 41 to 44. (This determination will be referred to as "split surface determination", hereinbelow.) That is, the control unit 40 determines the spin pattern of each of the rear wheels 3 and 4 each control cycle on the basis of the signals from the wheel speed sensors 41 to 44 and executes the split surface determination according to a split determination map stored in a ROM on the basis of the preceding spin patterns stored in a memory 50 and the present spin patterns. Then the control unit 40 sets split control flag $F_S$ to 1 when the other conditions for performing the split control are satisfied and resets the flag $F_S$ to 0 when predetermined conditions for interrupting the split control are satisfied.

The control unit 40 is further provided with a timer 51 for controlling the split control.

Figure 2:
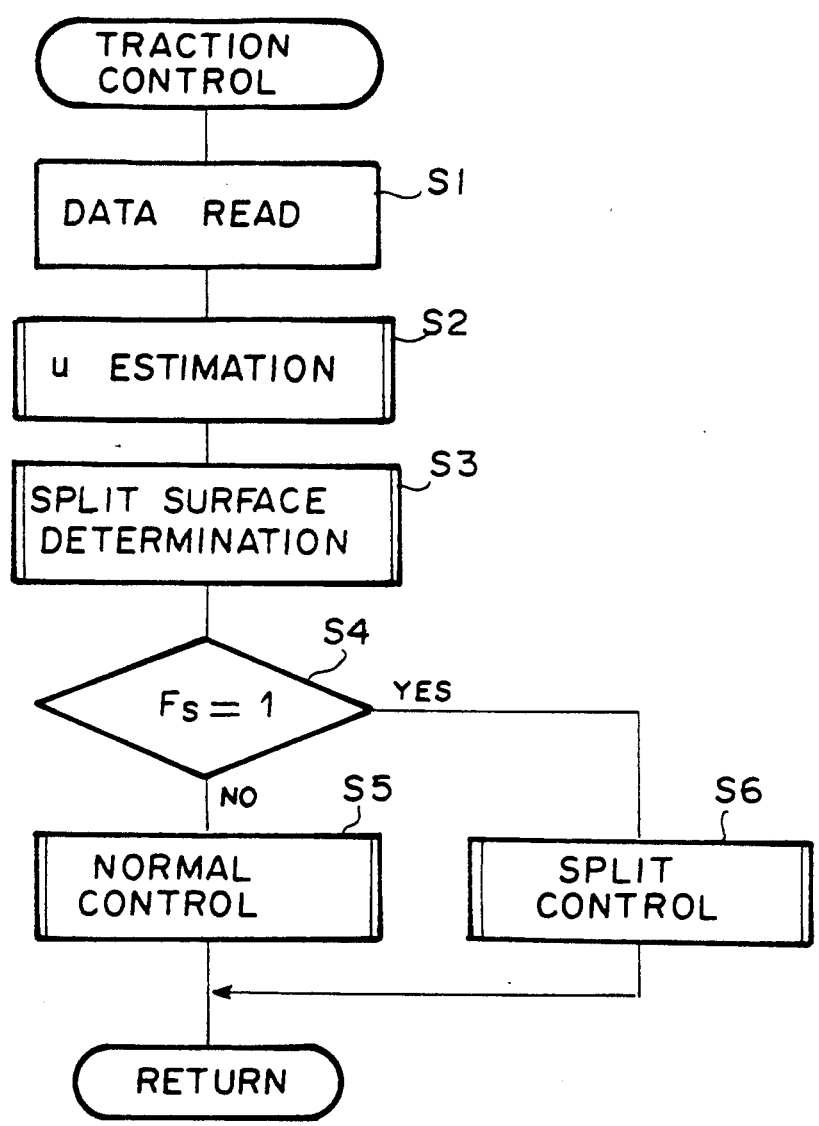
FIG. 2 is a flow chart for illustrating the basic control of the slip control system.

The traction control in this embodiment will be described with reference to the flow chart shown in FIG. 2, hereinbelow.

The control unit 40 reads various data in step S1 and estimates the friction coefficient $\mu$ of the road surface in step S2. Then the control unit 40 executes the split surface determination in step S3. Thereafter the control unit 40 executes the normal control when the split control flag $F_S$ is not 1 and executes the split control when the split control flag $F_S$ is 1. (steps S4 to S6).

Figure 3:
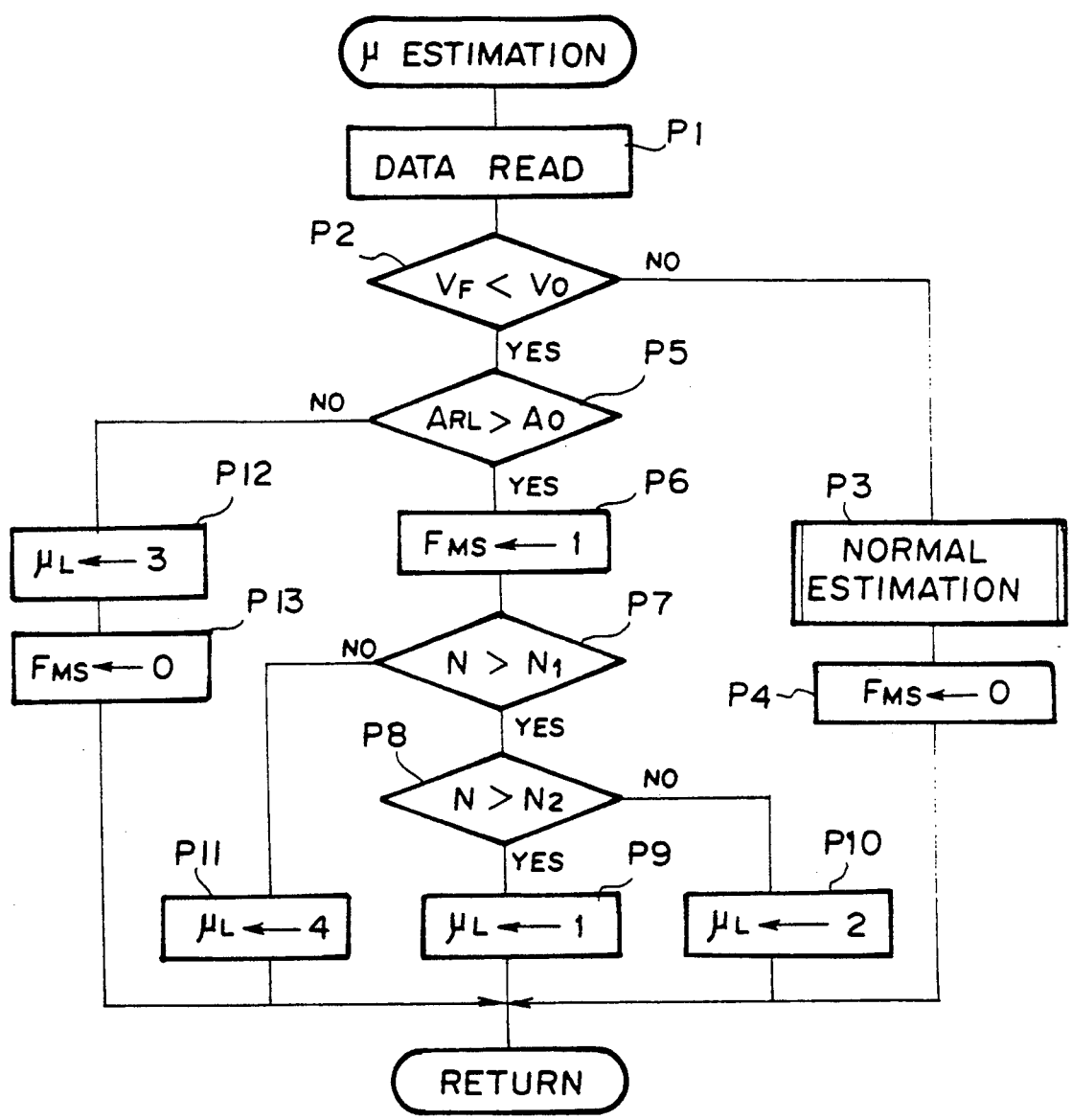
FIG. 3 is a flow chart for illustrating estimation of the friction coefficient.

The estimation of the friction coefficient $\mu$ for the left rear wheel 3 in this embodiment will be briefly described with reference to the flow chart shown in FIG. 3 by way of example.

The control unit 40 reads data in step P1 and determines in step P2 whether the average $V_F$ of the rotational speeds of the left and right rear wheels 3 and 4 represented by the signals from the wheel speed sensors 41 and 42 is smaller than a preset lower limit value Vo (e.g., 5 km/h). When the average front wheel speed $V_F$ is higher than the lower limit value Vo, the control unit 40 estimates in step P3 the friction coefficient $\mu_L$ of the road surface for the left rear wheel 3 on the basis of the average front wheel speed $V_F$ and the front wheel acceleration $A_F$ obtained on the basis of the average front wheel speed $V_F$ (normal estimation) and then sets starting $\mu$ estimation flag $F_{MS}$ to 0 in step P4. In this embodiment, the friction coefficient $\mu$ is classified into five from 1 to 5, 1 representing the minimum friction coefficient.

When it is determined in step P2 that the average front wheel speed $V_F$ is lower than the lower limit value Vo, the control unit 40 determines in step P5 whether the acceleration $A_{RL}$ of the wheel speed of the left rear wheel 3 obtained from the wheel speed of the left rear wheel 3 represented by the signals from the wheel speed sensor 43 is larger than a preset reference value Ao (e.g., 2G). When the left rear wheel speed acceleration $A_{RL}$ is larger than the reference value Ao, the control unit 40 sets the starting $\mu$ estimation flag FMS to 1 and estimates the friction coefficient $\mu_L$ of the road surface for the left rear wheel 3 according to the engine speed N represented by the signal from the engine speed sensor 45. That is, when the engine speed N is higher than a first predetermined value $N_1$ (e.g., 1100 rpm) and is not higher than a second predetermined value $N_2$ (e. g., 1500 rpm), the control unit 40 sets the friction coefficient $\mu_L$ of the road surface for the left rear wheel 3 to 2. (steps P7, P8 and P10) When the engine N is higher than the second predetermined value $N_2$, the control unit 40 sets the friction coefficient $\mu_L$ to 1. (steps P7 to P9). Further when the engine speed N is not higher than the first predetermined value $N_1$, the control unit 40 sets the friction coefficient $\mu_L$ to 4. (steps P7 and P11) That is, since the engine speed during starting increases as the driving wheels slips more, the friction coefficient of the road surface can be easily estimated according to the engine speed.

On the other hand, when the left rear wheel speed acceleration $A_{RL}$ is not larger than the reference value Ao, the control unit 40 adopts a fixed value (e.g., 3) as the friction coefficient $\mu_L$ of the road surface for the left rear wheel 3 and sets the starting $\mu$ estimation flag $F_{MS}$ to 0. (steps P5, P12 and P13)

The friction coefficient $\mu_R$ of the road surface for the right rear wheel 4 is estimated in the similar manner.

The normal control also is executed on the left and right rear wheels 3 and 4 separately from each other. For example, the normal control on the left rear wheel 3 is executed in the following manner. That is, the control unit 40 reads out an engine control target value $S_E$ and a brake control target value $S_B$ from table 1 which has been set using the friction coefficient $\mu_L$ of the road surface for the left rear wheel 3 as a parameter.

TABLE 1

| $\mu$ | 1 | 2 | 3 | 4 | 5 |
|---|---|---|---|---|---|
| $S_E$ | 2 | 3 | 4 | 5 | 6 |
| $S_B$ | 3 | 4 | 5 | 6 | 7 |

In the table 1, the engine control target value $S_E$ and the brake control target value $S_B$ are in terms of Km/h.

Then the control unit 40 determines whether the road which the vehicle is running is a rough road (rough road determination). For example, when the frequency at which the acceleration or the deceleration of the rear wheels 3 and 4 exceeds preset upper or lower limits is larger than a predetermined value, the control unit 40 determines that the road is a rough road and sets rough road flag $F_A$ to 1, and otherwise, it determines that the road is not a rough road and sets the rough road flag $F_A$ to 0.

Figure 4:
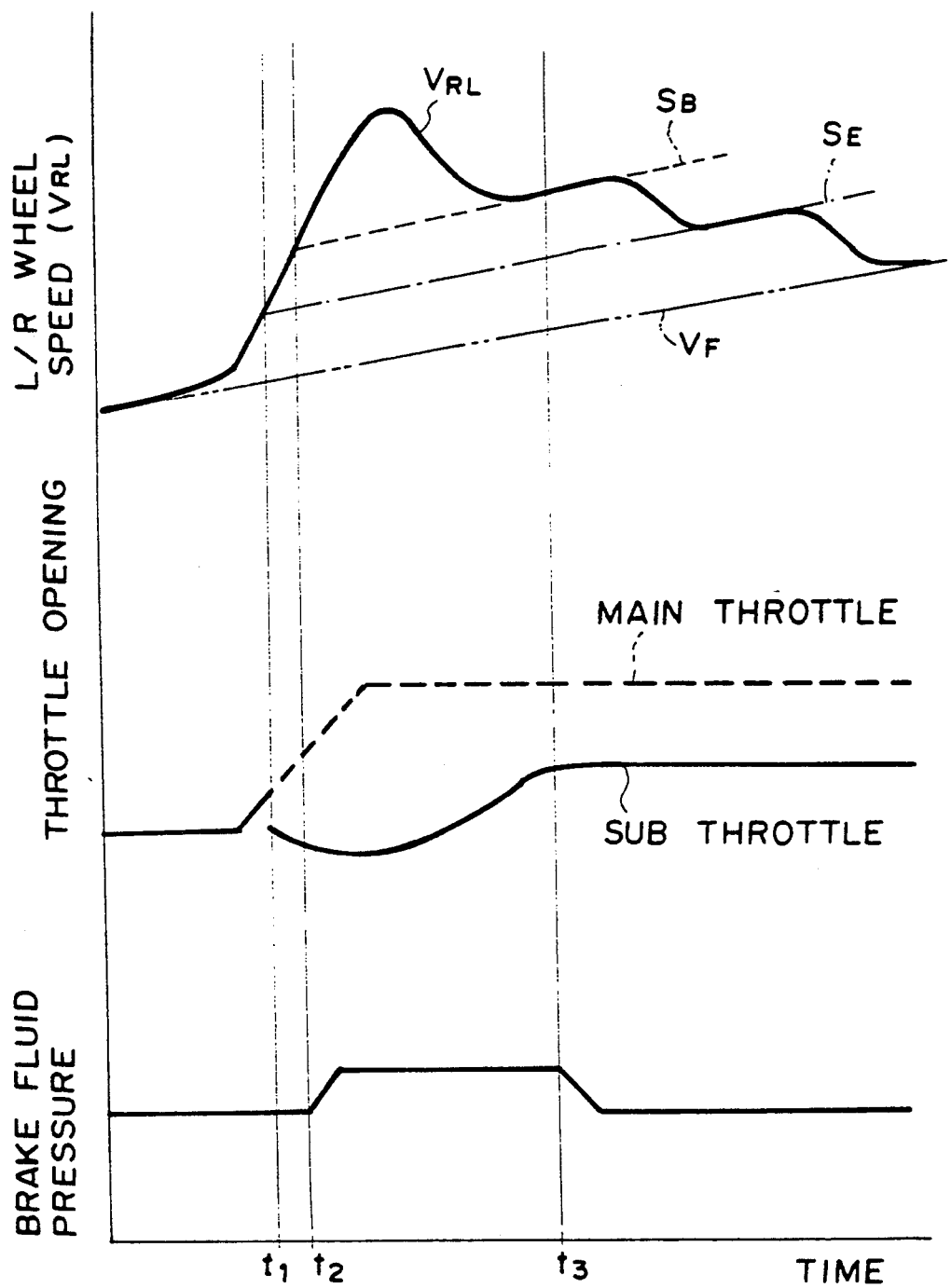
FIG. 4 is a time chart for illustrating the normal traction control.

When it is determined that the road the vehicle is running on is not a rough road, the control unit 40 calculates a slip value $S_1$ for the left rear wheel 3 by subtracting the average front wheel speed $V_F$ from the left rear wheel speed $V_{RL}$. That is, in this embodiment, the slip value $S_1$ for the left rear wheel 3 is the difference between the average front wheel speed $V_F$ and the left rear wheel speed $V_{RL}$. The control unit 40 starts the engine control at time $t_1$ (FIG. 4) at which the slip value $S_1$ for the left rear wheel 3 exceeds the engine control target value $S_E$ and feedback-controls the engine output torque by way of the actuator 38 which controls the opening of the sub throttle valve 39 so that the slip value $S_1$ for the left rear wheel 3 converges on the engine control target value $S_E$.

If the slip value $S_1$ for the left rear wheel 3 further increases in spite of such an engine control, the control unit 40 applies a braking pressure to the brake 13 for the left rear wheel 3 at time $t_2$ at which the slip value $S_1$ for the left rear wheel 3 exceeds the brake control target value $S_B$. The braking pressure is feedback controlled so that the slip value $S_1$ for the left rear wheel 3 converges on the brake control target value $S_B$. That is, both the engine control and the braking control are effected until the slip value $S_1$ for the left rear wheel 3 converges on the brake control target value $S_B$.

At time $t_3$ at which the slip value $S_1$ for the left rear wheel 3 falls to the brake control target value $S_B$, the braking control is interrupted and the braking pressure is released though the engine control is continued until a predetermined condition is satisfied.

The normal control on the right rear wheel 4 is executed in the similar manner. That is, the control unit 40 calculates a slip value $S_2$ for the right rear wheel 4 by subtracting the average front wheel speed $V_F$ from the right rear wheel speed $V_{RR}$. The control unit 40 starts the engine control when the slip value $S_2$ for the right rear wheel 4 exceeds the engine control target value $S_E$ and feedback-controls the engine output torque by way of the actuator 38 which controls the opening of the sub throttle valve 39 so that the slip value $S_2$ for the right rear wheel 4 converges on the engine control target value $S_E$. If the slip value $S_2$ for the right rear wheel 4 further increases in spite of such an engine control, the control unit 40 applies a braking pressure to the brake 14 for the right rear wheel 4 when the slip value $S_2$ for the right rear wheel 4 exceeds the brake control target value $S_B$. The braking pressure is feedback controlled so that the slip value $S_2$ for the right rear wheel 4 converges on the brake control target value $S_B$. When the slip value $S_2$ for the right rear wheel 4 falls to the brake control target value $S_B$, the braking control is interrupted and the braking pressure is released though the engine control is continued until a predetermined condition is satisfied.

Figure 5:
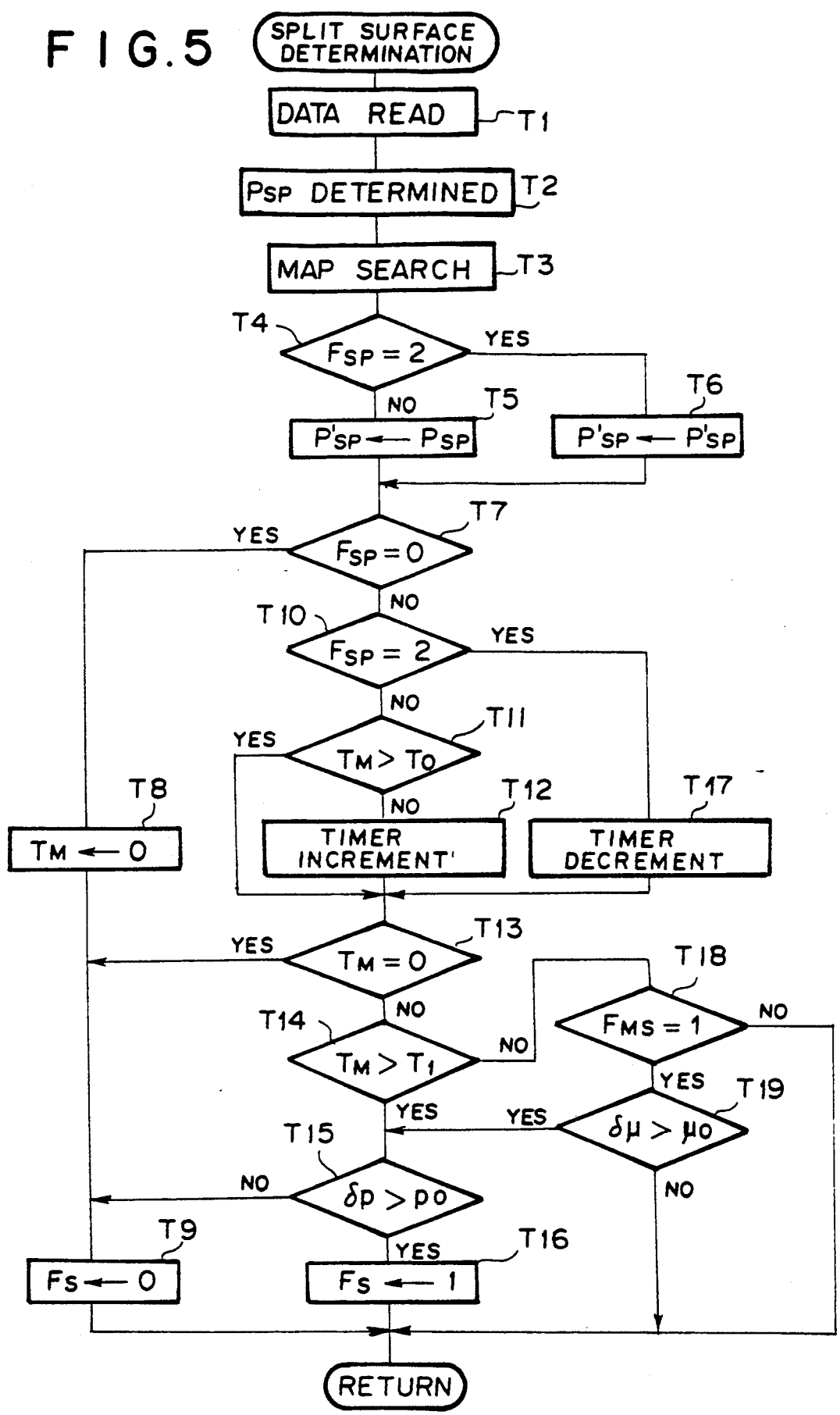
FIG. 5 is a flow chart for illustrating the split surface determination.

The split surface determination will be described with reference to the flow chart shown in FIG. 5, hereinbelow.

In step T1, the control unit 40 reads various data in step T1 and determines the spin pattern $P_{SP}$ for the left and right rear wheels 3 and 4 in step T2. That is, the control unit 40 sets first spin flag $F_1$ to 1 when the slip value $S_1$ for the left rear wheel 3 exceeds, for instance, the engine control target value $S_E$ and sets second spin flag $F_2$ to 1 when the slip value $S_2$ for the right rear wheel 4 exceeds the engine control target value $S_E$. Then the control unit 40 determines the present spin pattern $P_{SP}$ by referring the first spin flag $F_1$ and second spin flag $F_2$ to a spin pattern map shown in FIG. 5 which has been set using the first and second spin flags $F_1$ and $F_2$ as parameters. As shown in FIG. 6, the spin pattern map has been set so that the present spin pattern $P_{SP}$ is to be 0 when the first and second spin flag $F_1$ and $F_2$ are both 0, to be 1 when the first spin flag $F_1$ is 1 and $F_2$ are both 0, to be 2 when the first spin flag $F_1$ is 0 and the second spin flag $F_2$ is 1, and to be 3 when the first and second spin flags $F_1$ and $F_2$ are both 1.

The control unit 40 subsequently performs the split surface determination by referring the present spin pattern $P_{SP}$ and the preceding spin pattern $P'_{SP}$, which has been stored in the memory 50, to a split surface determination map shown in FIG. 7 which has been set using the present spin pattern $P_{SP}$ and the preceding spin pattern $P'_{SP}$ as parameters. As shown in FIG. 7, the split surface determination map has been set so that split surface determination flag $F_{SP}$ is to be 0 when the present spin pattern $P_{SP}$ is 0 except when the preceding spin pattern $P'_{SP}$ is 1 or 2, to be 2 when the present spin pattern $P_{SP}$ is 0 and the preceding spin pattern $P'_{SP}$ is 1 or 2, to be 1 when the present spin pattern $P_{SP}$ is 1 except when the preceding spin pattern $P'_{SP}$ is 2 or 3, to be 0 when the present spin pattern $P_{SP}$ is 1 and the preceding spin pattern $P'_{SP}$ is 2 or 3, to be 1 when the present spin pattern $P_{SP}$ is 2 except when the preceding spin pattern $P'_{SP}$ is 1 or 3, to be 0 when the present spin pattern $P_{SP}$ is 2 and the preceding spin pattern $P'_{SP}$ is 1 or 3, and to be 0 when the present spin pattern $P_{SP}$ is 3. That the split surface determination flag $F_{SP}$ is 0 represents that the road surface the vehicle is running is not a split surface. That the split surface determination flag $F_{SP}$ is 1 represents that the road surface the vehicle is running on is a split surface. That the split surface determination flag $F_{SP}$ is 2 represents that the vehicle is still running on a split surface. The reason why the split surface determination flag $F_{SP}$ is set to 2 even if the present spin pattern $P_{SP}$ is 0, i.e., none of the rear wheels 3 and 4 are spinning, when one of the rear wheels 3 and 4 was spinning in the preceding flow, i.e., the preceding spin pattern $P'_{SP}$ is 1 or 2, is to improve the response of the system when the rear wheel comes to spin again. The reason why the split surface determination flag $F_{SP}$ is set to 0 even if the present spin pattern $P_{SP}$ is 1 or 2, i.e., one of the rear wheels 3 and 4 is spinning, when the other rear wheel was spinning in the preceding flow is not to determine by mistake that the vehicle is running on a split surface when the left and right rear wheels alternately come to spin during running on a low friction coefficient road like a frozen road.

After step T3, the control unit 40 determines in step T4 whether the split surface determination flag $F_{SP}$ is 2, and when it is determined that the split surface determination flag $F_{SP}$ is not 2, the control unit 40 substitutes the present spin pattern $P_{SP}$ for the preceding spin pattern $P'_{SP}$ in step T5. Otherwise the control unit 40 holds the preceding spin pattern $P'_{SP}$ in step T6.

Thereafter the control unit 40 determines in step T7 whether the split surface determination flag $F_{SP}$ is 0, and when it is determined that the split surface determination flag $F_{SP}$ is 0, the control unit 40 resets count $T_M$ of the timer 51 in step T8 and sets the split control flag $F_S$ to 0 in step T9, which means that the split control is not to be performed.

On the other hand, when it is determined in step T8 that the split surface determination flag $F_{SP}$ is not 0, the control unit 40 determines in step T10 whether the split surface determination flag $F_{SP}$ is 2. When it is determined that the split surface determination flag $F_{SP}$ is not 2, the control unit 40 determines in step T11 whether the count $T_M$ of the timer 51 is larger than a predetermined upper limit $T_0$ (e.g., 10 seconds). When it is determined that the count $T_M$ is not larger than the upper limit $T_0$, the control unit 40 increments the count $T_M$ in step T12 and then determines whether the count $T_M$ is 0 in step T13. When it is determined that the count $T_M$ is not 0, the control unit 40 determines in step T14 whether the count $T_M$ is larger than a predetermined lower limit $T_1$ (e.g., 0.5 seconds). When it is determined that the count $T_M$ is larger than the lower limit $T_1$, the control unit 40 determines in step T15 whether the brake fluid pressure difference $\delta p$ represented by the signals from the first and second pressure sensors 46 and 47 is larger than a predetermined reference value $P_0$. When it is determined that the former is larger than the latter, the control unit 40 sets the split control flag $F_S$ to 1 in step T16, which means that the split control is to be performed.

When it is determined in step T10 that the split surface determination flag $F_{SP}$ is 2, the control unit 40 decrements the count $T_M$ in step T17 and then proceeds to step T13. When the count $T_M$ is 0, the control unit 40 sets the split control flag $F_S$ to 0, whereby the control is shifted from the split control to the normal control.

When it is determined in step T14 that the count $T_M$ is not larger than the lower limit $T_1$, the control unit 40 determines in step T18 whether the starting $\mu$ estimation flag $F_{MS}$ has been set to 1. That is, the control unit 40 determines whether the friction coefficient $\mu$ was estimated during starting. When it is determined that the starting $\mu$ estimation flag $F_{MS}$ has been set to 1, the control unit 40 determines in step T19 whether the difference $\sigma\mu(=|\mu_L-\mu_R|)$ between the friction coefficient $\mu_L$ of the road surface for the left rear wheel 3 and the friction coefficient $\mu_R$ of the road surface for the right rear wheel 4 is larger than a predetermined reference value $\mu_0$. When it is determined that the former is larger than the latter, the control unit 40 determines in step T15 whether the brake fluid pressure difference $\delta p$ is larger than the reference value $P_0$. When it is determined that the former is larger than the latter, the control unit 40 sets the split control flag $F_S$ to 1 in step T16, which means that the split control is to be performed.

Figure 8:
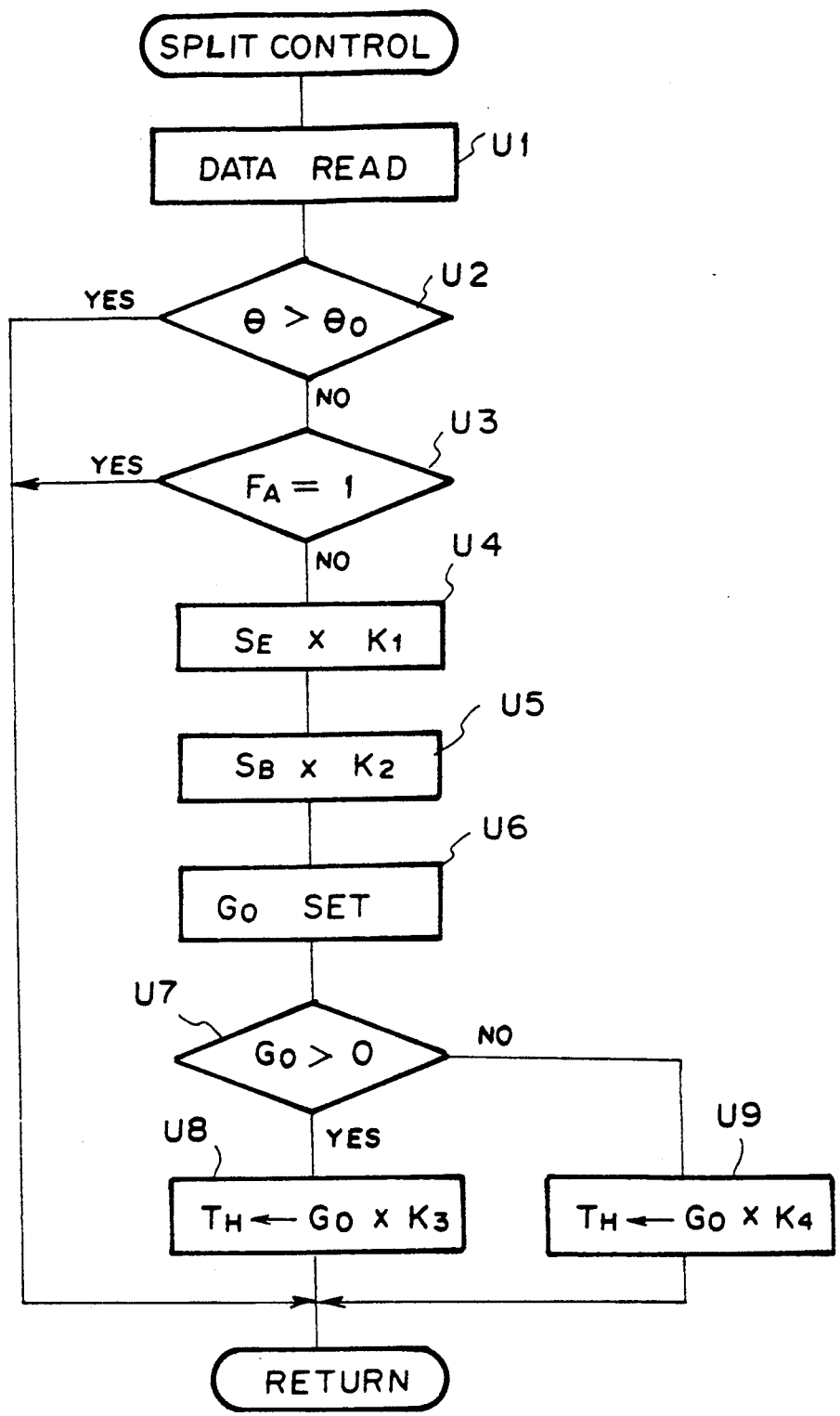
FIG. 8 is a flow chart for illustrating the split control.

Now the split control will be described with reference to the flow chart shown in FIG. 8.

Figure 9:
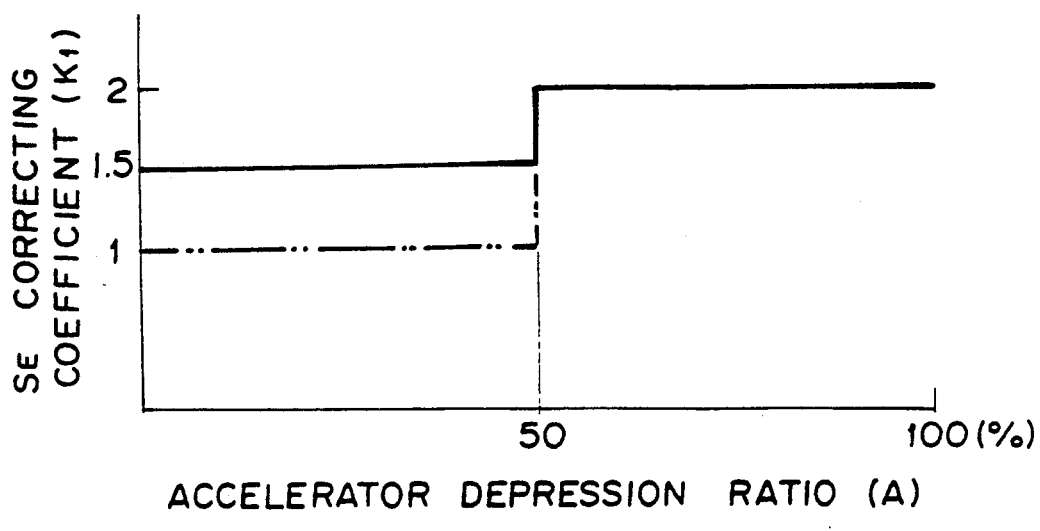
FIG. 9 is a view showing an example of the map for determining the engine control target value correcting coefficient.

The control unit 40 reads various data in step U1 and determines in step U2 whether the steering angle $\theta$ as detected by the steering angle sensor 49 is larger than a predetermined value $\theta_0$. When it is determined that the former is not larger than the latter, the control unit 40 further determines in step U3 whether rough road flag $F_A$ has been set to 1, which represents that the vehicle is running a rough road. When it is determined that the rough road flag $F_A$ has not been set to 1, the control unit 40 corrects, in step U4, the engine control target value $S_E$ by multiplying the engine control target value $S_E$ by an engine control target value correction coefficient K1 which has been set using an accelerator depression ratio A as a parameter as shown in FIG. 9 which is the ratio of the amount of depression of the accelerator pedal 36 at that time to the maximum amount of depression of the accelerator pedal 36 (in percentage). As shown in FIG. 9, the correction coefficient K1 is set to 1.5 when the accelerator depression ratio A is smaller than 50% and to 2.0 when the accelerator depression ratio A is not smaller than 50%.

Figure 10:
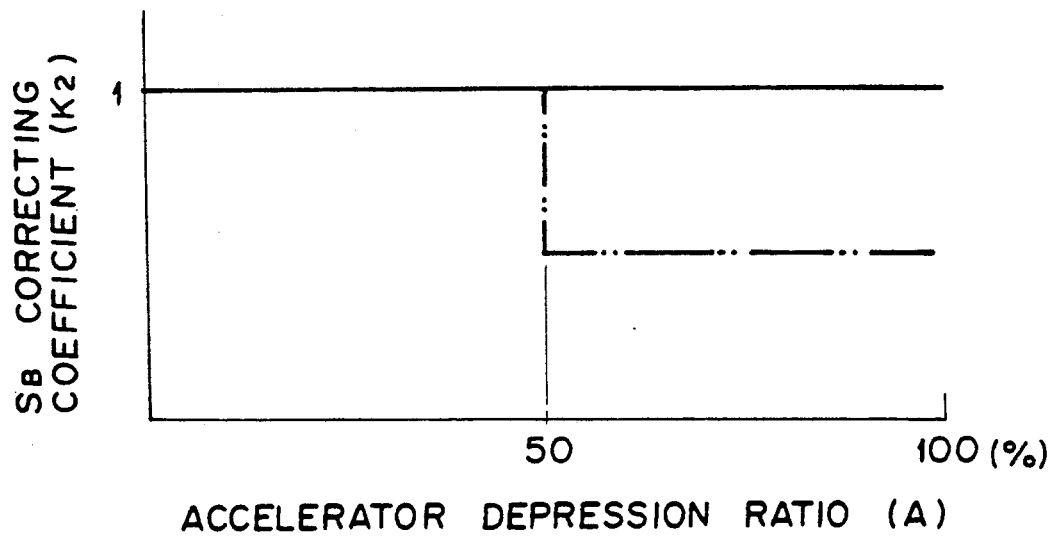
FIG. 10 is a view showing an example of the map for determining the brake control target value correcting coefficient.

Then in step U5, the control unit 40 corrects the brake control target value $S_B$ by multiplying a brake control target value correction coefficient K2 which has been set using the accelerator depression ratio A as a parameter as shown in FIG. 10. As shown in FIG. 10, the correction coefficient K2 is set to be 1 irrespective of the accelerator depression ratio A and the brake control target value $S_B$ is not changed in this particular embodiment. However, the correction coefficient K2 may be set to be smaller than 1 when the accelerator depression ratio A is not smaller than 50% as shown by the chained line in FIG. 10.

Then the control unit 40 sets a basic throttle gain $G_0$ in step U6. That is, the control unit 40 reads out a throttle opening gain label corresponding to the actual deviation of the driving wheel speed from the engine control target value $S_E$ and the actual rate of change of the driving wheel speed from a gain label table which has been set using the deviation of the driving wheel speed from the engine control target value $S_E$ and the rate of change of the driving wheel speed as parameters as shown in FIG. 11. Then the control unit 40 reads out a basic throttle gain $G_0$ corresponding to the gain label from a table shown in FIG. 12. The basic throttle gain $G_0$ is set as a percentage to the angle through which the sub throttle valve 39 is rotated when it is full opened from the full closed state.

Thereafter the control unit 40 determines in step U7 whether the basic throttle gain $G_0$ set in step U6 is larger than 0, and when it is determined that the former is larger than the latter, the control unit 40 calculates in step U8 a final throttle opening $T_H$ by correcting the basic throttle gain $G_0$ with a first gain correcting coefficient K3 obtained from a map which has been set using the accelerator depression ratio A as a parameter as shown in FIG. 13. As shown in FIG. 13, the first gain correcting coefficient K3 is set to be 1.0 when the accelerator depression ratio A is smaller than 50% and to be 2.0 when the accelerator depression ratio A is not smaller than 50%. That is, the coefficient K3 is corrected so that the gain toward opening the sub throttle valve 39 is larger. Then the control unit 40 causes the actuator 38 to move the sub throttle valve 39 to the final throttle opening $T_H$.

When it is determined in step U7 that the basic throttle gain $G_0$ is not larger than 0, the control unit 40 calculates in step U9 a final throttle opening $T_H$ by correcting the basic throttle gain $G_0$ with a second gain correcting coefficient K4 obtained from a map which has been set using the accelerator depression ratio A as a parameter as shown in FIG. 14. As shown in FIG. 14, the first gain correcting coefficient K3 is set to be 1.0 when the accelerator depression ratio A is smaller than 50% and to be 0.5 when the accelerator depression ratio A is not smaller than 50%. That is, the coefficient K3 is corrected so that the gain toward closing the sub throttle valve 39 is larger.

The operation of the slip control system of this embodiment will be described hereinbelow.

Figure 15:
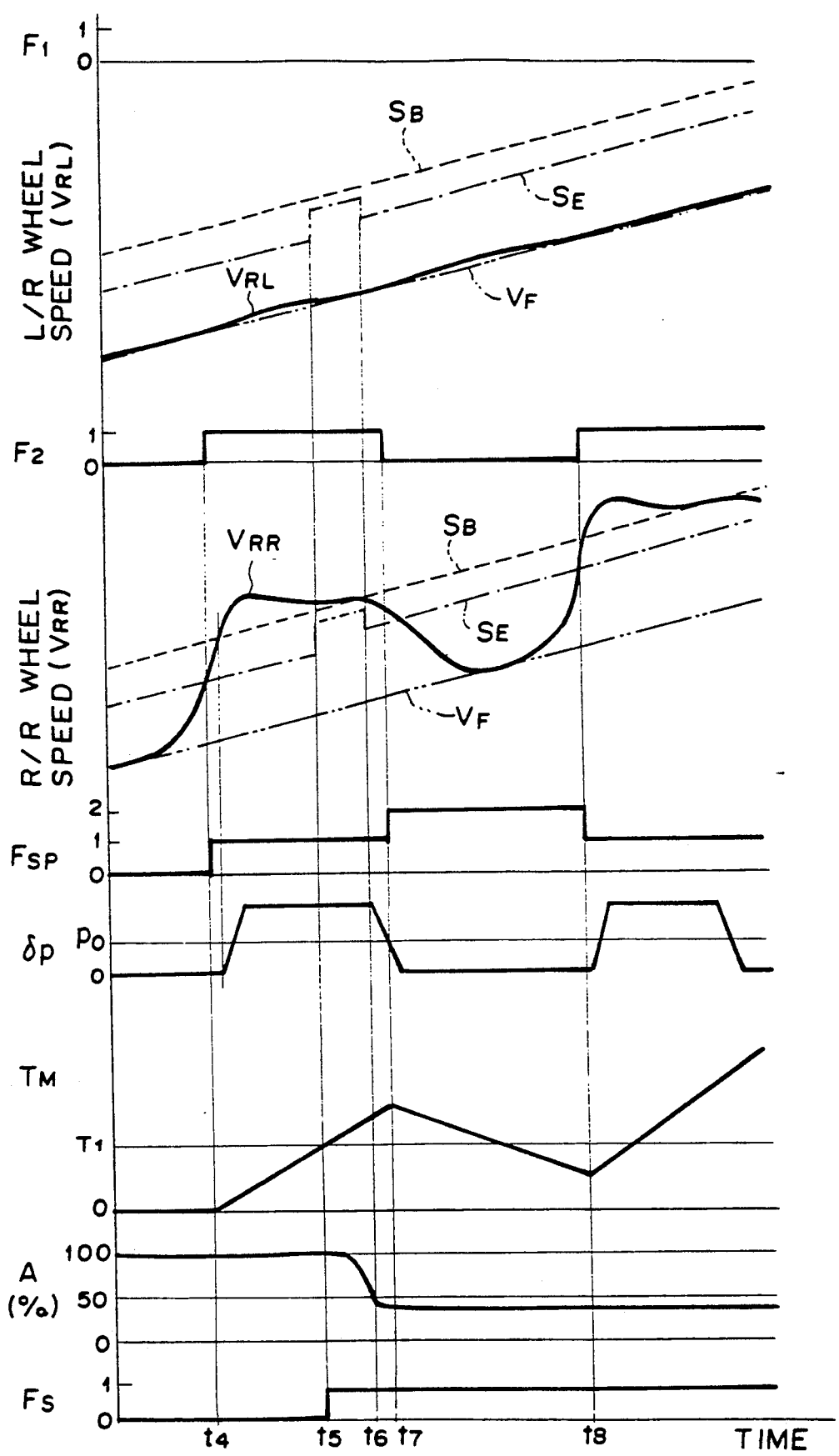
FIGS. 15 to 17 are time charts for illustrating the operation of the slip control system.

In FIG. 15, when the right rear wheel speed $V_{RR}$ exceeds the engine control target value $S_E$ with the left rear wheel speed $V_{RL}$ being substantially equal to the average front wheel speed $V_F$, the second spin flag $F_2$ is set to 1 (at time t4). In such a case, the first spin flag $F_1$ is kept at 0 since the left rear wheel speed $V_{RL}$ is substantially equal to the average front wheel speed $V_F$. Accordingly the split surface determination flag $F_{SP}$ is set to 1 and at the same time the timer 51 starts counting up. When the right rear wheel speed $V_{RR}$ further increases and exceeds the brake control target value $S_B$, application of the braking pressure to the brake 14 for the right rear wheel 4 is initiated.

When the difference $\sigma_P$ between the braking pressures applied to the brakes 13 and 14 for the left and rear wheels 3 and 4 at time t5 when the timer 51 counts the predetermined lower limit $T_1$ is larger than the reference value $P_0$, the split control flag $F_S$ is set to 1 and the control is shifted from the normal control to the split control. That is, from the time t5, the engine control target value $S_E$ is increased. When the accelerator depression ratio A is larger than 50%, the engine control target value $S_E$ is corrected by a large amount. While the slip value $S_2$ for the right rear wheel 4 which is slipping is larger than the brake control target value $S_B$, application of the braking pressure to the brake 14 through the brake pressure line 30 is continued and the right rear wheel 4 is applied with braking force while the brake 13 for the left rear wheel 3 whose slip is smaller than the brake control target value $S_B$ is not applied with the braking pressure. Accordingly, the engine output which is less suppressed by increase in the engine control target value $S_E$ is preferentially distributed to the left rear wheel 3, whereby an excellent acceleration can be obtained. Further since the opening gain of the sub throttle valve 39 is enlarged, better engine response is obtained and at the same time, since the closing gain of the sub throttle valve 39 is reduced, unnecessary reduction of the engine output is prevented and acceleration can be further improved.

Further, in this embodiment, the split control is not performed until the difference $\sigma_P$ between the braking pressures applied to the brakes 13 and 14 for the left and rear wheels 3 and 4 becomes larger than the reference value $P_0$ even if the count of the timer 51 exceeds the predetermined lower limit T1, the engine out cannot be increased with the braking pressure for the right rear wheel 4 being insufficient, whereby inadvertent slip of the vehicle can be prevented.

Then the engine control target value $S_E$ is somewhat lowered when the accelerator depression ratio A becomes smaller than 50% (at time t6).

By thus changing the amount of correction of the engine control target value $S_E$ according to the amount of depression of the accelerator pedal 36 which reflects the the driver's will, the engine out can be prevented from excessively increasing when the amount of depression of the accelerator pedal 36 is relatively small, thereby ensuring the running stability, and the engine output can be adequately increased to obtain an excellent acceleration when the amount of depression is relatively large.

As shown by the chained line in FIG. 9, the engine control target value correcting coefficient K1 may be set to be 1 when the accelerator depression ratio A is smaller than 50%. In such a case, the split control is initiated when the accelerator depression ratio A exceeds 50%.

When the right rear Wheel speed $V_{RR}$ falls below the engine control target value $S_E$ with the left rear wheel speed $V_{RL}$ being kept substantially equal to the average front wheel speed $V_F$ (at time t7), the split surface determination flag $F_{SP}$ is set to 2 and the timer 51 starts counting down with the split control flag $F_S$ held at 1. In this embodiment, the counting-down gain of the timer is set to be a half of the counting-up gain. Accordingly, when the timer 51 counts up for 5 seconds, the count $T_M$ of the timer 51 is not nullified until the timer 51 counts down for 10 seconds. When the count $T_M$ of the timer 51 is nullified, the split control flag $F_S$ is reset to 0.

If the right rear wheel speed $V_{RR}$ exceeds the engine control target value $S_E$ again (at time t8) before the count $T_M$ of the timer 51 is nullified, the split surface determination flag $F_{SP}$ is set to 1 and the timer 51 resumes counting up. With this arrangement, response of the split control in the case where the right rear wheel 4 comes to spin again is improved.

Further, when the vehicle comes to turn during the split control, the control is shifted from the split control to the normal control and the engine control target value $S_E$ is reduced, thereby preventing the vehicle from getting unstable.

Further, when it is determined that the vehicle is running a rough road, the control is shifted to the normal control, whereby the rear wheels 3 and 4 are prevented from rotating at an excessively high speed on a rough road and at the same time, malfunction due to a wrong determination can be avoided.

Figure 16:
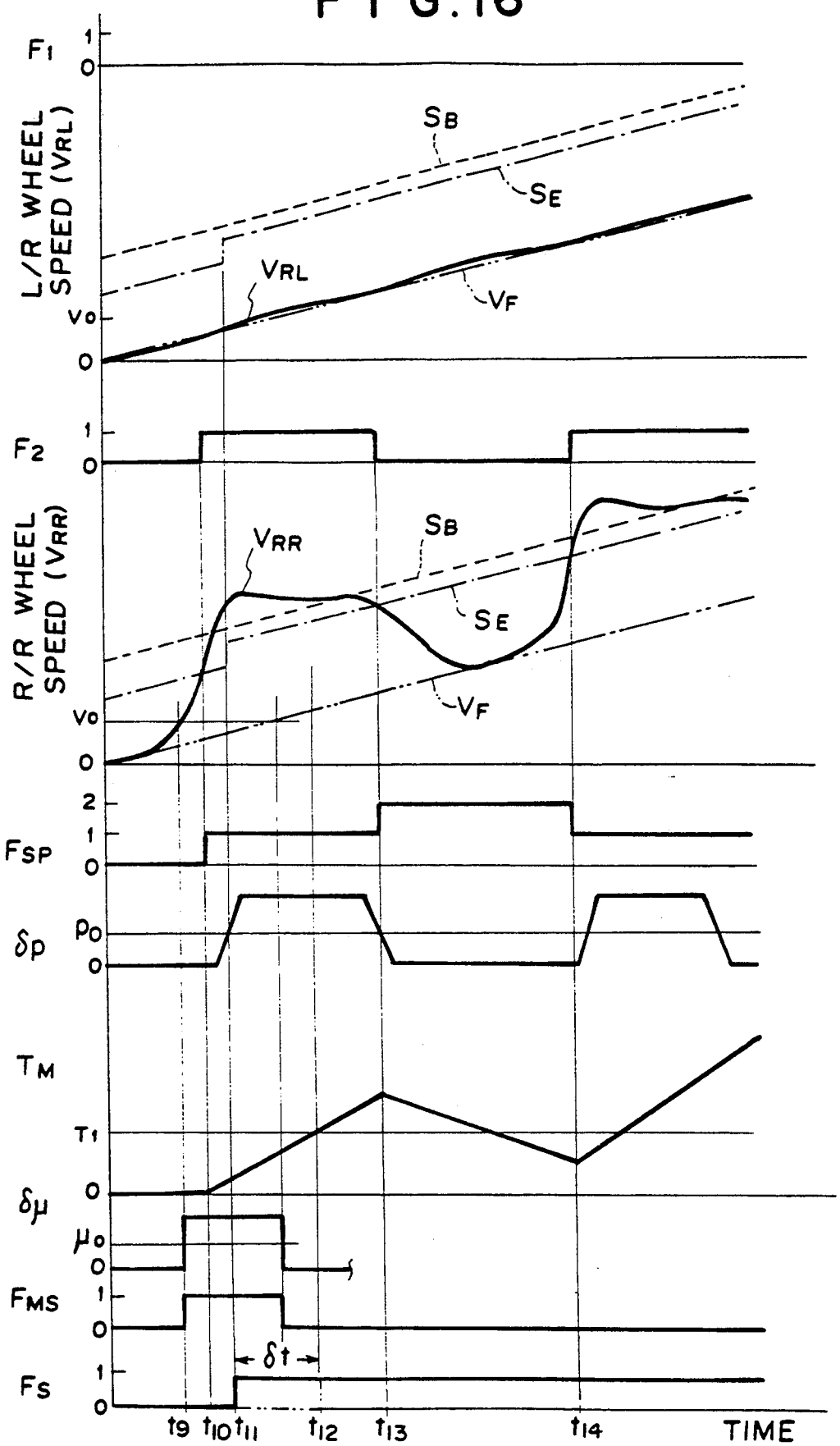

When the right rear wheel 4 begins to slip during starting where the left rear wheel speed $V_{RL}$ is substantially equal to the average front wheel speed $V_F$ and when the right rear wheel speed acceleration $A_{RR}$ exceeds the predetermined reference value $A_0$ (at time t9) as shown in FIG. 16, the starting $\mu$ estimation flag $F_{MS}$ is set to 1. If the engine speed N is higher than the second predetermined value $N_2$ at this time, the friction coefficient $\mu_R$ estimated for the right rear wheel 4 is set to 4 and the friction coefficient $\mu_L$ estimated for the left rear wheel 3 is set to 3 since the left rear wheel 3 is hardly slipping.

When the right rear wheel speed $V_{RR}$ exceeds the engine control target value $S_E$ (at time t10), the second spin flag $F_2$ is set to 1. In such a case, the first spin flag $F_1$ is kept at 0 since the left rear wheel speed $V_{RL}$ is substantially equal to the average front wheel speed $V_F$. Accordingly the split surface determination flag $F_{SP}$ is set to 1 and at the same time the timer 51 starts counting up.

When the right rear wheel speed $V_{RR}$ further increases and exceeds the brake control target value $S_B$, application of the braking pressure to the brake 14 for the right rear wheel 4 is initiated. When the difference $\sigma_P$ between the braking pressures applied to the brakes 13 and 14 for the left and rear wheels 3 and 4 exceeds the reference value $P_0$ (at time t11), the split control flag $F_S$ is set to 1 and the control is shifted from the normal control to the split control irrespective of the count $T_M$ of the timer 51 since the difference $\sigma\mu$ between the friction coefficient $\mu_L$ of the road surface for the left rear wheel 3 and the friction coefficient $\mu_R$ of the road surface for the right rear wheel 4 has exceeded the predetermined reference value $\mu_0$ at this time as described above. That is, from the time t11, the engine control target value $S_E$ is increased by a predetermined value. While the slip value $S_2$ for the right rear wheel 4 which is slipping is larger than the brake control target value $S_B$, application of the braking pressure to the brake 14 through the brake pressure line 30 is continued and the right rear wheel 4 is applied with braking force while the brake 13 for the left rear wheel 3 whose slip is smaller than the brake control target value $S_B$ is not applied with the braking pressure. Accordingly, the engine output which is less suppressed by increase in the engine control target value $S_E$ is preferentially distributed to the left rear wheel 3 as if the function of the differential 8 is suppressed, whereby an excellent starting performance can be obtained. Further, since the difference $\sigma_P$ between the braking pressures applied to the brakes 13 and 14 for the left and rear wheels 3 and 4 is larger than the reference value $P_0$ at this time, the engine out cannot be increased with the braking pressure for the right rear wheel 4 being insufficient, whereby inadvertent slip of the vehicle can be prevented.

On the other hand, when the difference $\sigma\mu$ between the friction coefficient $\mu_L$ of the road surface for the left rear wheel 3 and the friction coefficient $\mu_R$ of the road surface for the right rear wheel 4 is not larger than the predetermined reference value $\mu_0$, the split control flag $F_S$ is set to 1 as shown by the chained line in FIG. 16 and the control is shifted to the split control from the normal control when the timer 51 counts up to the lower limit T1 (at time t12). Accordingly, when the vehicle is started on a road where the difference $\sigma\mu$ between the friction coefficient $\mu_L$ and the friction coefficient $\mu_R$ is large, the split control is initiated earlier by time $\sigma_t$, whereby an excellent starting performance is obtained.

When the average front wheel speed $V_F$ exceeds the reference value $V_0$, the starting $\mu$ estimation flag $F_{MS}$ is reset to 0 and initiation of the split control is delayed until the count $T_M$ of the timer 51 exceeds the lower limit T1. Accordingly, since the split control is not executed until the count $T_M$ of the timer 51 exceeds the lower limit T1 even if it is determined that the vehicle is running on a split surface road, the split surface determination flag $F_{SP}$ is reset to 0 if the left rear wheel 3 comes into a spinning state before the count $T_M$ of the timer 51 exceeds the lower limit T1, whereby malfunction due to wrong determination can be prevented.

When the right rear wheel speed $V_{RR}$ falls below the engine control target value $S_E$ with the left rear wheel speed $V_{RL}$ being kept substantially equal to the average front wheel speed $V_F$ (at time t13), the split surface determination flag $F_{SP}$ is set to 2 and the timer 51 starts counting down with the split control flag $F_S$ held at 1. In this embodiment, the counting-down gain of the timer is set to be a half of the counting-up gain. Accordingly, when the timer 51 counts up for 5 seconds, the count $T_M$ of the timer 51 is not nullified until the timer 51 counts down for 10 seconds. When the count $T_M$ of the timer 51 is nullified, the split control flag $F_S$ is reset to 0.

If the right rear wheel speed $V_{RR}$ exceeds the engine control target value $S_E$ again (at time t14) before the count $T_M$ of the timer 51 is nullified, the split surface determination flag $F_{SP}$ is set to 1 and the timer 51 resumes counting up. With this arrangement, response of the split control in the case where the right rear wheel 4 comes to spin again is improved.

Since the split control is not initiated until a predetermined time lapses even if it is determined that the vehicle is running a split road, malfunction of performing the split control when the left and right rear wheels alternately spin can be prevented.

Figure 17:
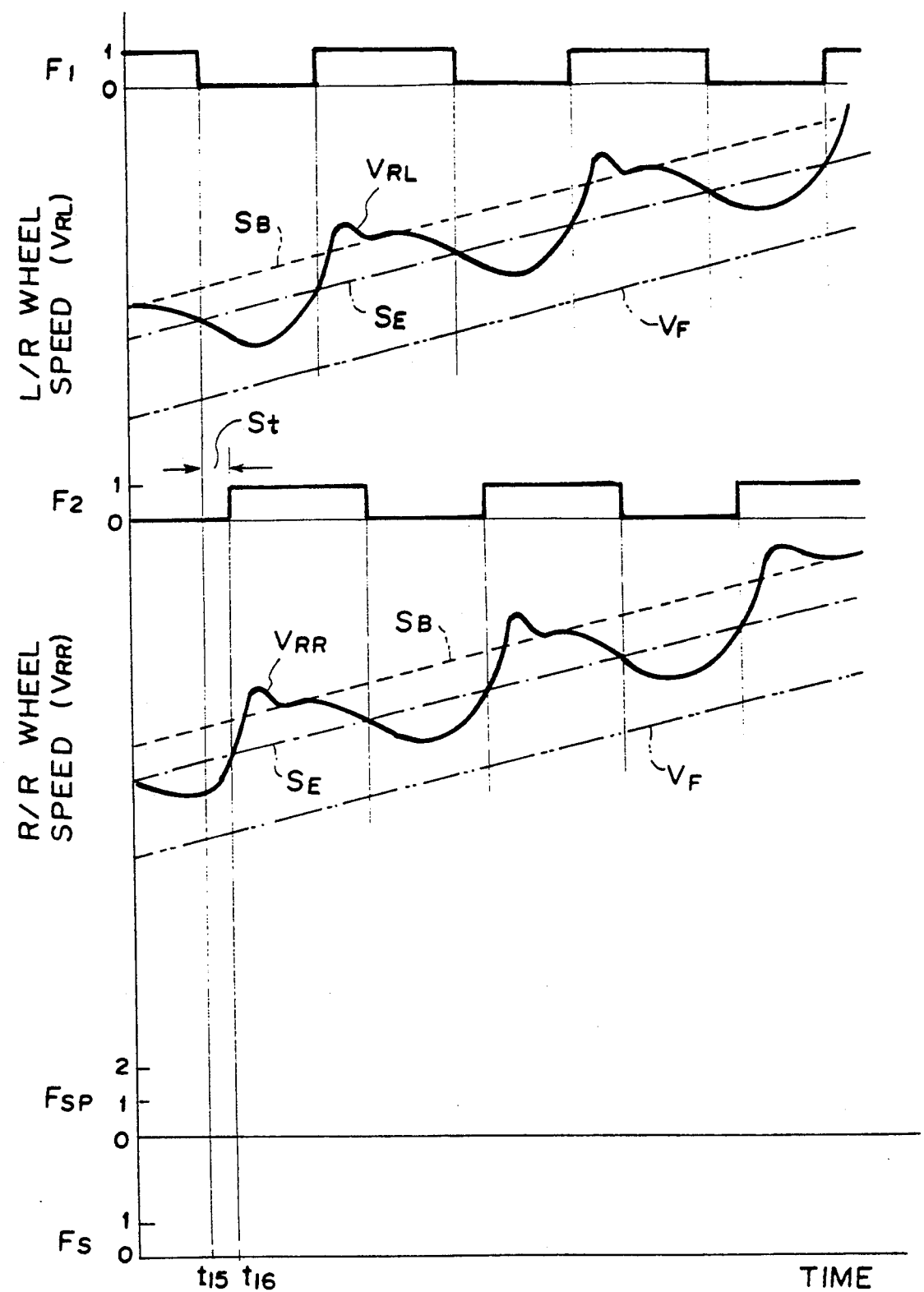

On a low friction coefficient road, the left and right rear wheels 3 and 4 can sometimes spin alternately as shown in FIG. 17. In such a state, after, for instance, the left rear wheel speed $V_{RL}$ falls below the engine control target value $S_E$, the right rear wheel speed $V_{RR}$ can sometimes exceed the engine control target value $S_E$ upon the next sampling as shown in FIG. 17. In such a case it seems that the condition for determining that the vehicle is running on a split surface road is satisfied since both the left and right rear wheels 3 and 4 come into a non-slip state after time t15 at which the left rear wheel speed $V_{RL}$ falls below the engine control target value $S_E$ and before time t16 at which the right rear wheel speed $V_{RR}$ exceeds the engine control target value $S_E$ and the second spin flag $F_2$ is set to 1 at the time t16. The time t16 is a sampling time St after the time t15.

In this embodiment, the map shown in FIG. 7 is arranged so that when the spin flag of one of the rear wheels is inverted and the spin flag of the other rear wheel has been set to 1, the split surface determination flag $F_{SP}$ is not set to 1. That is, since the first spin flag $F_1$ for the left rear wheel 3 is set to 0 and the second spin flag $F_2$ for the right rear wheel 4 is set to 1 at time t16, the present spin pattern $P_{SP}$ is set to 2 according to the map shown in FIG. 6. At time, t15, since the first spin flag $F_1$ was 1 and the second spin flag $F_2$ was 0, the preceding spin pattern $P'_{SP}$ stored in the memory 50 is 1. Accordingly, the split surface determination flag $F_{SP}$ is set to 0 according to the map shown in FIG. 7 and the control unit 40 performs the normal control in step S5 in FIG. 2. Thus the mistake in split surface determination can be prevented.

Figure 18:
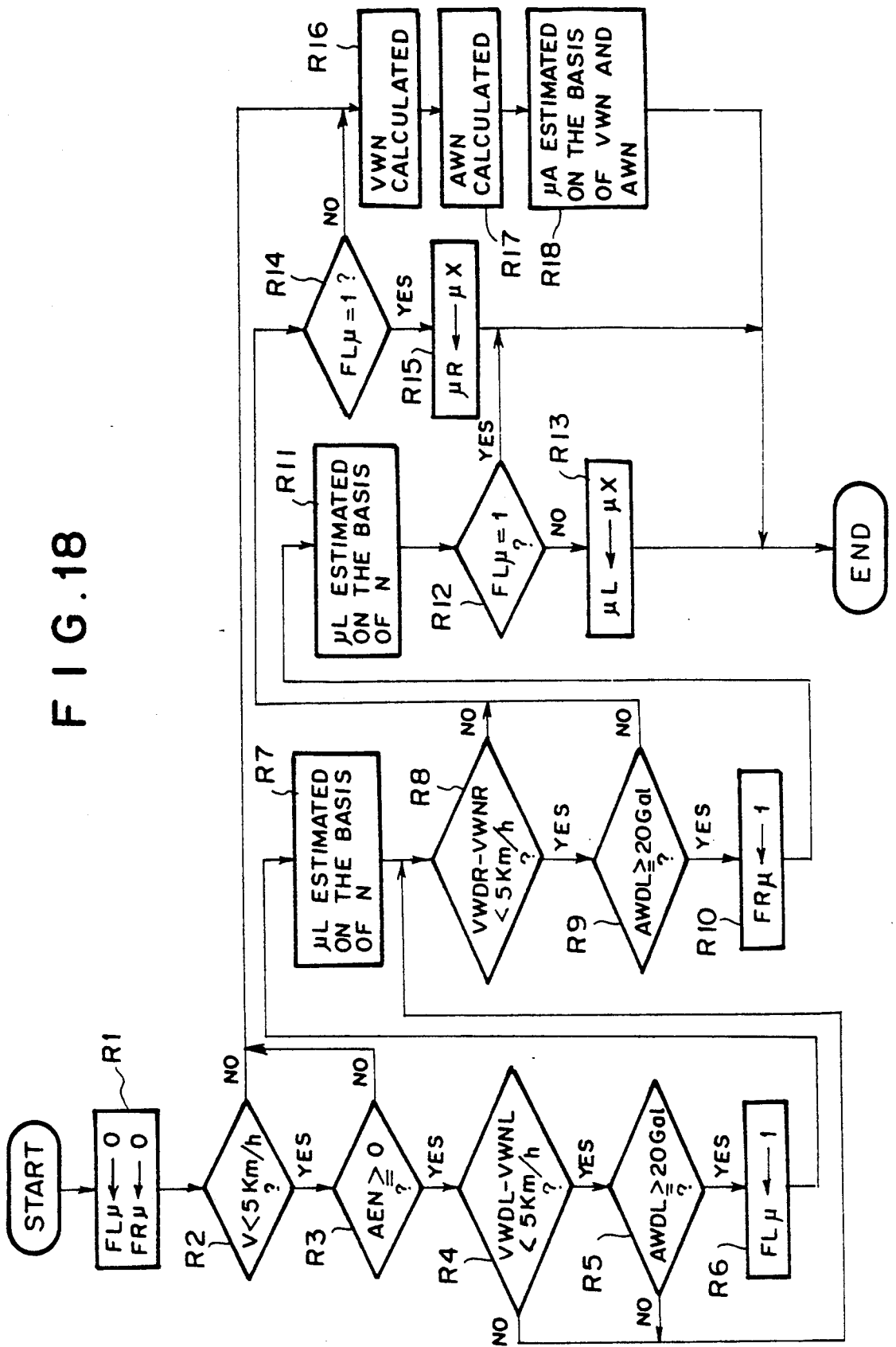
FIG. 18 is a flow chart for illustrating another manner of estimation of the friction coefficient.

Another example of estimation of the friction coefficient $\mu$ will be described with reference to the flow chart shown in FIG. 18, hereinbelow. In this example, the control unit 40 estimates the friction coefficient $\mu$ for each of the left and right driving wheels on the basis of the engine speed only when the driving wheel satisfies a particular condition that the vehicle speed is lower than a first predetermined value, and/or the difference between the driven wheel peripheral speed and the peripheral speed of the driving wheel is larger than a second predetermined value and the peripheral acceleration of the driving wheel is not lower than a third predetermined value, and when one of the left and rear wheels satisfies the particular condition and the other driving wheel does not satisfy the particular condition, the control unit 40 estimates the friction coefficient $\mu$ for said the other driving wheel at a value which is in a particular relation with the friction coefficient $\mu$ estimated for said one driving wheel or at a predetermined value.

In step R1, the control unit 40 initializes both left $\mu$ estimation flag $FL\mu$ and right $\mu$ estimation flag $FR\mu$ to 0. Then in step R2, the control unit 40 determines whether the vehicle speed V is lower than 5 Km/h. When it is determined that the vehicle speed V is lower than 5 Km/h, the control unit 40 determines in step R3 whether the change AEN in the engine speed N obtained by differentiating the engine N is not smaller than 0.

When it is determined that the change AEN in the engine speed is not smaller than 0, that is, the engine speed N is being kept constant or is increasing, the control unit 40 determines in step R4 whether the difference between the peripheral speed VWDL of the left rear wheel 3 and the peripheral speed VWNL of the left front wheel 1 is smaller than 5 KM/h. When it is determined that the former is smaller than the latter, the control unit 40 determines in step R5 whether the peripheral acceleration AWDL of the left rear wheel 1 obtained by differentiating the left rear wheel peripheral speed VWNL is not lower than 2.0 Gal.

When it is determined in step R5 that the former is not lower than the latter, the control unit 40 sets the left $\mu$ estimation flag $FL\mu$ to 1 in step R6. Then the control unit 40 obtains a friction coefficient $\mu$ corresponding to the engine speed N referring the engine speed N to the engine speed-friction coefficient map shown in the following table 2 and sets the friction coefficient $\mu$ thus obtained as the friction coefficient $\mu_L$ of the road surface in contact with the left rear wheel 3 during starting of the vehicle. (step R7) Then the control unit 40 proceeds to step R8.

When it is determined in step R4 that the difference between the peripheral speed VWDL of the left rear wheel 3 and the peripheral speed VWNL of the left front wheel 1 is not smaller than 5 KM/h, or when it is determined in step R5 that the left rear wheel peripheral acceleration AWDL is lower than 2.0 Gal, the control unit 40 directly proceeds to step R8. In step R8, the control unit 40 determines whether the difference between the peripheral speed VWDR of the right rear wheel 4 and the peripheral speed VWNR of the right front wheel 2 is smaller than 5 KM/h. When it is determined that the former is smaller the latter, the control unit 40 determines in step R9 whether the peripheral acceleration AWDR of the right rear wheel 2 obtained by differentiating the right rear wheel peripheral speed VWNR is not lower than 2.0 Gal.

When it is determined in step R9 that the former is not lower than the latter, the control unit 40 sets the right μ estimation flag FLμ to 1 in step R10. Then the control unit 40 obtains a friction coefficient μ corresponding to the engine speed N referring the engine speed N to the engine speed-friction coefficient map shown in the following table 2 and sets the friction coefficient μ thus obtained as the friction coefficient $\mu_R$ of the road surface in contact with the right rear wheel 3 during starting of the vehicle. (step R11) Then the control unit 40 proceeds to step R12.

TABLE 2

| engine speed N (rpm) | μ |
|---|---|
| N < 1200 | 1 |
| 1200 ≦ N < 1500 | 2 |
| N ≧ 1500 | 4 |

In step R12, the control unit 40 determines whether the left μ estimation flag FLμ has been set to 1. When it is determined that the left μ estimation flag FLμ has not been set to 1, the control unit 40 estimates the friction coefficient $\mu_L$ of the road surface in contact with the left rear wheel 3 during starting of the vehicle at a value μX which is in proportion to the friction coefficient $\mu_R$ of the road surface in contact with the right rear wheel 3 during starting of the vehicle obtained in step R11, e.g., $\mu X = 1.5 \times \mu_R$. (step R13)

When it is determined in step R8 that the difference between the peripheral speed VWDR of the right rear wheel 4 and the peripheral speed VWNR of the right front wheel 2 is not smaller than 5 KM/h, or when it is determined in step R9 that the peripheral acceleration AWDR of the right rear wheel 2 is lower than 2.0 Gal, the control unit 40 determines in step R14 whether the left μ estimation flag FLμ has been set to 1. When it is determined that the left μ estimation flag FLμ has been set to 1, the control unit 40 estimates the friction coefficient $\mu_R$ of the road surface in contact with the right rear wheel 4 during starting of the vehicle at a value μX which is in proportion to the friction coefficient $\mu_L$ of the road surface in contact with the right rear wheel 3 during starting of the vehicle obtained in step R7, e.g., $\mu X = 1.5 \times \mu_L$. (step R15)

When it is determined in step R2 that the vehicle speed V is not lower than 5 Km/h, or when it is determined in step R3 that the change AEN in the engine speed is smaller than 0, or when it is determined in step R14 that the left μ estimation flag FLμ has not been set to 1, the control unit 40 calculates the average VWN of the peripheral speeds VWNL and VWNR of the front wheels 1 and 2 in step R16 and calculates the acceleration AWN of the average front wheel peripheral speed VWN. Then the control unit 40 reads out the friction coefficient μ corresponding to the values of the average front wheel peripheral speed VWN and the acceleration AWN thereof from a data map in which the friction coefficient μ of the road surface is related to the average front wheel peripheral speed VWN and the acceleration AWN thereof, and estimates the friction coefficient μA during running for both the left and right rear wheels 3 and 4 at the friction coefficient μ thus read out. (step R18).

As can be understood from the description above, in accordance with this example of estimation of the friction coefficient μ, the friction coefficient μ of the road surfaces in contact with the respective driving wheels can be precisely estimated not only during running of the vehicle but also during starting of the vehicle, and at the same time, since when one of the left and rear wheels satisfies the particular condition and the other driving wheel does not satisfy the particular condition, the friction coefficient μ for said the other driving wheel is estimated on the basis of the estimated friction coefficient μ for said one driving wheel, the friction coefficients μ for the left and right driving wheels cannot greatly deviate from each other.

What is claimed is:

1. A slip control system for a vehicle having a driving force distributing means which distributes engine output to left and right driving wheels, comprising a first slip detecting means which periodically detects the slip of the left driving wheel, a second slip detecting means which periodically detects the slip of the right driving wheel, a split surface determining means for determining whether the vehicle is running on a split surface road, where the parts of the road in contact with the left and right driving wheels have different friction coefficients, on the basis of the slips of the respective driving wheels detected by the first and second slip detecting means, and a traction control means having an engine output control means for controlling the engine output and causing the engine output control means to suppress the engine output, when the slip of at least one of the driving wheels detected by the first and second slip detecting means exceeds a first threshold value, wherein said split surface determining means periodically determines a spin pattern of the driving wheels on a basis of the detection of the first and second slip detecting means, storing the spin patterns thus determined and determining whether the vehicle is running on a split surface road on the basis of the present spin pattern and the preceding spin pattern according to a predetermined split surface determining rule.

2. A slip control system as defined in claim 1 wherein said traction control means has a brake control means in addition to said engine output control means and, when the slip of at least one of the driving wheels exceeds a second threshold value the traction control means causes the brake control means to apply a braking pressure to the driving wheel or wheels, and when the split surface determining means determines that the vehicle is running on a split surface road, the traction control means causes said engine output control means to increase the engine output.

3. A slip control system as defined in claim 1 wherein said traction control means causes the engine output control means not to suppress the engine output when the split surface determining means determines that the vehicle is running on a split surface road.

4. A slip control system as defined in claim 1 wherein said traction control means causes the engine output control means to increase the engine output when the split surface determining means determines that the vehicle is running on a split surface road.

5. A slip control system as defined in claim 1 wherein said split surface determining rule is arranged so that the split surface determining means determines that the vehicle is running on a split surface road even if the present spin pattern indicates that neither of the driving wheels is slipping so long as the preceding spin pattern indicates that one of the driving wheels is slipping.

6. A slip control system as defined in claim 5 wherein said split surface determining rule is arranged so that the split surface determining means does not determine that the vehicle is running on a split surface road even if the present spin pattern indicates that one of the driving wheels is slipping so long as the preceding spin pattern indicates that the other driving wheel is slipping.

7. A slip control system as defined in claim 6 wherein said split surface determining means counts the time for which it keeps determining that the vehicle is running on a split surface road on the basis of the fact that the preceding spin pattern indicates that one of the driving wheels is slipping and the present spin pattern indicates that the same driving wheel is slipping or the fact that the present spin pattern indicates that one of the driving wheels is slipping while the preceding spin pattern indicates that neither of the driving wheels is slipping, and when the split surface determining means determines that the vehicle is running on a split surface road on the basis of the fact that the preceding spin pattern indicates that one of the driving wheels is slipping though the present spin pattern indicates that neither of the driving wheels is slipping just after the split surface determining means continues determining that the vehicle is running on a split surface road on the basis of one of the aforesaid facts, the split surface determining means continues to determine that the vehicle is running on a split surface road even if the successive present spin patterns indicate that neither of the driving wheels is slipping until the shorter of a predetermined time and the time for which the split surface determining means continues determining that the vehicle is running on a split surface road on the basis of one of the aforesaid facts lapses.

8. A slip control system as defined in claim 7 wherein said traction control means has a brake control means in addition to said engine output control means and, when the slip of at least one of the driving wheels exceeds a second threshold value the traction control means causes the brake control means to apply a braking pressure to the driving wheel or wheels so that the slip of the driving wheel or wheels converges on a target value, and when the split surface determining means determines that the vehicle is running on a split surface road, the traction control means causes said engine output control means to increase the engine output.

9. A slip control system as defined in claim 5 wherein said split surface determining means counts the time for which it continues determining that the vehicle is running on a split surface road on the basis of the fact that the preceding spin pattern indicates that one of the driving wheels is slipping and the present spin pattern indicates that the same driving wheel is slipping or the fact that the present spin pattern indicates that one of the driving wheels is slipping while the preceding spin pattern indicates that neither of the driving wheels is slipping, and when the split surface determining means determines that the vehicle is running on a split surface road on the basis of the fact that the preceding spin pattern indicates that one of the driving wheels is slipping though the present spin pattern indicates that neither of the driving wheels is slipping just after the split surface determining means continues determining that the vehicle is running on a split surface road on the basis of one of the aforesaid facts, the split surface determining means continues to determine that the vehicle is running on a split surface road even if the successive present spin patterns indicate that neither of the driving wheels is slipping until the shorter of a predetermined time and the time for which the split surface determining means continues determining that the vehicle is running on a split surface road on the basis of one of the aforesaid facts lapses.

10. A slip control system as defined in claim 9 wherein said traction control means has a brake control means in addition to said engine output control means and, when the slip of at least one of the driving wheels exceeds a second threshold value the traction control means causes the brake control means to apply a braking pressure to the driving wheel or wheels so that the slip of the driving wheel or wheels converges on a target value, and when the split surface determining means determines that the vehicle is running on a split surface road, the traction control means causes said engine output control means to increase the engine output.

11. A slip control system as defined in claim 10 in which said traction control means causes the engine output control means to increase the engine output when the split surface determining means determines that the vehicle is running on a split surface road.

12. A slip control system as defined in claim 1 wherein said split surface determining rule is arranged so that the split surface determining means does not determine that the vehicle is running on a split surface road even if the present spin pattern indicates that one of the driving wheels is slipping so long as the preceding spin pattern indicates that the other driving wheel is slipping.

13. A slip control system as defined in claim 12 wherein said traction means has a brake control means in addition to said engine output control means and, when the slip of at least one of the driving wheels exceeds a second threshold value the traction control means causes the brake control means to apply a braking pressure to the driving wheel or wheels so that the slip of the driving wheel or wheels converges on a target value, and when the split surface determining means determines that the vehicle is running on a split surface road, the traction control means causes said engine output control means to increase the engine output.

14. A slip control system as defined in claim 12 wherein said split surface determining rule is arranged so that the split surface determining means determines that the vehicle is running on a split surface road even if the present spin pattern indicates that neither of the driving wheels is slipping so long as the preceding spin pattern indicates that one of the driving wheels is slipping.

15. A slip control system as defined in claim 1 wherein said split surface determining means counts the time for which it continues determining that the vehicle is running on a split surface road on the basis of the fact that the preceding spin pattern indicates that one of the driving wheels is slipping and the present spin pattern indicates that the same driving wheel is slipping or the fact that the present spin pattern indicates that one of the driving wheel is slipping while the preceding spin pattern indicates that neither of the driving wheels is slipping, and when the split surface determining means determines that the vehicle is running on a split surface road on the basis of the fact that the preceding spin pattern indicates that one of the driving wheels is slipping though the present spin pattern indicates that neither of the driving wheels is slipping just after the split surface determining means continues determining that the vehicle is running on a split surface road on the basis of one of the aforesaid facts, the split surface determining means continues to determine that the vehicle is running on a split surface road even if the successive present spin patterns indicate that neither of the driving wheels is slipping until the shorter of a predetermined time and the time for which the split surface determining means continues determining that the vehicle is running on a split surface road on the basis of one of the aforesaid facts lapses.

16. A slip control system as defined in claim 15 wherein said traction control means has a brake control means in addition to said engine output control means and, when the slip of at least one of the driving wheels exceeds a second threshold value the traction control means causes the brake control means to apply a braking pressure to the driving wheel or wheels so that the slip of the driving wheel or wheels converges on a target value, and when the split surface determining means determines that the vehicle is running on a split surface road, the traction control means causes said engine output control means to increase the engine output.

17. A slip control system as defined in claim 15 wherein said split surface determining rule is arranged so that the split surface determining means determines that the vehicle is running on a split surface road even if the present spin pattern indicates that neither of the driving wheels is slipping so long as the preceding spin pattern indicates that one of the driving wheels is slipping.

18. A slip control system for a vehicle having a driving force distributing means which distributes engine output to left and right driving wheels, comprising
a first slip detecting means for periodically detecting the slip of the left driving wheel,
a second slip detecting means for periodically detecting the slip of the right driving wheel,
a split surface determining means for determining whether the vehicle is running on a split surface road, where the parts of the road in contact with the left and right driving wheels have different friction coefficients, on the basis of the slips of the respective driving wheels detected by the first and second slip detecting means, and
a traction control means including an engine output control means and a brake control means for causing the engine output control means, when the slip of at least one of the driving wheels detected by the first and second slip detecting means exceeds a first threshold value, to control the engine output to a predetermined value so that the slip of the driving wheel or wheels converges on a first target value so long as the split surface determining means determines that the vehicle is not running on a split surface road, and causes the brake control means, when the slip of at least one of the driving wheels exceeds a second threshold value, to apply a braking pressure to the driving wheel or wheels so that the slip of the driving wheel or wheels converges on a second target value,
wherein the traction control means increases said predetermined value so that the engine output control means increases the engine output when the split surface determining means determines that the vehicle is running on a split surface road.

19. A split surface determining system for determining whether a vehicle is running on a split surface road where the parts of the road in contact with left and right driving wheels have different friction coefficients, comprising
a first slip detecting means for periodically detecting the slip of the left driving wheel,
a second slip detecting means for periodically detecting the slip of the right driving wheel, and
a determining means for periodically determining a spin pattern of the driving wheels on the basis of the detection of the first and second slip detecting means, storing the spin patterns thus determined and determining whether the vehicle is running on a split surface road on the basis of the present spin pattern and the preceding spin pattern according to a predetermined split surface determining rule.

20. A split surface determining system as defined in claim 19 wherein said split surface determining rule is arranged so that the split surface determining means determines that the vehicle is running on a split surface road even if the present spin pattern indicates that neither of the driving wheels is slipping so long as the preceding spin pattern indicates that one of the driving wheels is slipping.

21. A split surface determining system as defined in claim 20 wherein said spit surface determining rule is arranged so that the split surface determining means does not determine that the vehicle is running on a split surface road even if the present spin pattern indicates that one of the driving wheels is slipping so long as the preceding spin pattern indicates that the other driving wheel is slipping.

* * * * *